3,141,893
4-AMINO-COUMARINS
Rudolf Pfister and Alfred R. Sallmann, both of Basel, Switzerland, assignors to Geigy Chemical Corporation, Ardsley, N.Y., a corporation of Delaware
No Drawing. Filed Nov. 14, 1961, Ser. No. 152,178
Claims priority, application Switzerland Nov. 15, 1960
5 Claims. (Cl. 260—343.2)

The present invention concerns new coumarin derivatives which can be used in particular as pharmaceuticals and intermediate products for the production of same.

Coumarin derivatives of the general Formula I

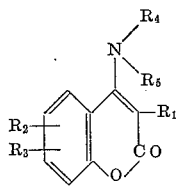

I wherein $R_1$ represents an alkyl, phenyl or phenylalkyl radical the phenyl nucleus of which can be substituted by halogen atoms, $R_2$ and $R_3$ represent hydrogen, a halogen atom or a low alkyl or alkoxy group, $R_4$ represents hydrogen or a radical corresponding to the definition for $R_1$ or a low dialkylaminoalkylene group having 2 to 4 carbon atoms in the alkylene group, and $R_5$ represents hydrogen or a low alkyl group which can be bound direct to the alkyl group $R_4$, have not been known up to now.

The preferred compounds are embraced by the following general Formula Ia

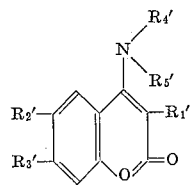

Ia wherein $R_1'$ represents a lower alkyl, the phenyl or a phenyl-(lower)alkyl group, $R_2'$ and $R_3'$ independently of each other represent hydrogen or a halogen atom, $R_4'$ represents hydrogen, lower alkyl or lower dialkylaminoalkylene, the alkylene group having 2 to 4 carbon atoms, and $R_5'$ represents hydrogen or a lower alkyl group.

In this specification, "lower" indicates a radical having 1 to 4 carbon atoms. "Halogen" and the prefix "halo-" have the meaning of chlorine, fluorine and bromine.

It has now surprisingly been found that these compounds have vauable pharmacological properties, in particular analgesic, antiphlogistic and antipyretic activity. They are suitable for the alleviation of pain and for the treatment of rheumatic complaints. For these purposes the compounds according to the invention can be administered per os, with or without the usual suitable fillers, in the form of powders, tablets or other usual forms. For injection, the compounds can be used in their neutral form or occasionally free basic form or, advantageously, in the form of non-toxic salts of said free bases with inorganic or organic acids, these different forms being dissolved in water or other suitable solvents and, if desired, mixed with the usual carriers.

In the compounds of the general Formula I, $R_1$ is, for example, an alkyl radical such as, e.g. the methyl, ethyl, n-propyl, isopropyl, n-butyl, isobutyl, sec. butyl, tert. butyl, n-amyl, isoamyl or n-hexyl radical; an aromatic radical such as, e.g. the phenyl, m-chlorophenyl, p-chlorophenyl, m-fluorophenyl, p-fluorophenyl or p-bromophenyl radical; or an araliphatic radical such as, e.g. the benzyl, p-chlorobenzyl, p-bromobenzyl, β-phenylethyl or γ-phenylpropyl radical. Ring substituents $R_2$ and $R_3$ are, for example, chlorine, bromine or fluorine atoms, methyl, ethyl or isopropyl radicals, methoxy, ethoxy, n-propoxy, isopropoxy and n-butoxy radicals. Examples of radicals $R_4$ are, in addition to hydrogen, those given as examples of $R_1$. When $R_4$ is a dialkylaminoalkylene group with 2 to 4 carbon atoms in the alkylene group, the alkyl substituents can be, for example, the methyl, ethyl, n-propyl, isopropyl, n-butyl, isobutyl, sec. butyl, n-amyl, isoamyl, n-hexyl and α,β-dimetyhlbutyl radical. Representatives of $R_5$ are, for example, hydrogen and the methyl, ethyl, n-propyl, isopropyl, n-butyl and isobutyl radical. In addition, $R_4$ and $R_5$ together with the adjacent nitrogen atom can also represent, e.g. the ethyleneimino, pyrrolidyl-(1), piperidino, hexamethyleneimino or heptamethyleneimino radical.

To produce compounds of the general formula I, compounds of the general Formula II

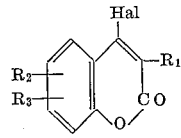

II are reacted with compounds of the general Formula III

III wherein Hal represents chlorine or bromine and $R_1$, $R_2$, $R_3$, $R_4$ and $R_5$ have the meanings given above.

Provided that they have a basic radical $R_4$, the compounds obtained of the general Formula I can be converted if desired into their monoacid salt with inorganic or organic acids. Acids suitable for salt formation are, e.g. hydrochloric acid, hydrobromic acid, phosphoric acid, sulphuric acid, methane sulphonic acid, ethane sulphonic acid, acetic acid, lactic acid, succinic acid, maleic acid, fumaric acid, malic acid, tartaric acid, critric acid, benzoic acid, phthtalic acid, salicylic acid and mandelic acid.

The reactions of compounds of the general Formula II with amines of the general Formula III are performed at temperatures of about 10–250° C. in the presence or absence of solvents or diluents such as, e.g. dioxan, ethanol, benzene or phenol, as well as of catalysts such as, e.g. copper powder, sodium or potassium iodide. If necesary, the reaction is performed in an autoclave depending on the temperature required for the reaction and on the boiling point of the amine to be reacted and, if used, on that of the solvent. Advantageously an excess of the amine to be reacted serves to bind the halogen hydracid liberated.

In addition, compounds of the general Formula I can be produced by heating compounds of the general Formula IV

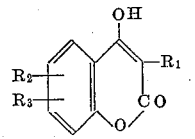

IV in which $R_1$, $R_2$ and $R_3$ have the meanings given above, with compounds of the general Formula III give above.

Finally, compounds of the general Formula I are produced from other compounds which are embraced by that general formula by reacting, in the presence of an acid binding agent, compounds of the general Formula V

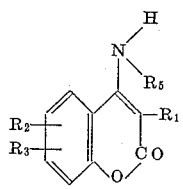

with reactive esters of compounds of the general Formula VI $$R_4'\text{—OH} \qquad \qquad \text{VI}$$

wherein $R_4'$ has the meaning given above for $R_4$ with the exception of hydrogen and phenyl radicals and $R_1$, $R_2$, $R_3$ and $R_5$ have the meanings given above.

The following examples further illustrate the production of the new compounds of the general Formula I according to the invention. Parts are given therein as parts by weight and their relationship to parts by volume is as that of grammes to cubic centimetres. The temperatures are in degrees Centigrade.

*Example 1*

20 parts of 3-butyl-4-chlorocoumarin are heated for 9 hours at 120° in an autoclave with 120 parts of anhydrous 50% ethanolic dimethylamine. After evaporating off the solvent, the residue is taken up in ether, the ethereal solution is washed twice with water, dried and concentrated in vacuo. The 3-butyl-4-dimethylamino-coumarin crystallises into platelets from anhydrous ether and then melts at 58–60°.

3 - phenyl - 4 - diethylamino-coumarin (M.P. 168–169° from methanol) is obtained in an analogous manner.

*Example 2*

12 parts of 3-phenyl-4-chlorocoumarin and a mixture of 6 parts of liquid ammonia and 34 parts of anhydrous ethanol are heated for 7 hours at 120° in an autoclave. After cooling and evaporating off the ammonia and the solvent, the residue is extracted with chloroform, the chloroform extract is filtered, the filtrate is washed with water and dried over sodium sulphate. The chloroform is removed and the residue is crystallised from methanol. The 3-phenyl-4-aminocoumarin separates out as pale yellowish crystals which melt at 211°.

3-butyl-4-amino-coumarin (M.P. 175–178° from ethyl acetate) is obtained in an analogous manner.

*Example 3*

10 parts of 3-phenyl-4-chlorocoumarin, 15 parts of dimethylaminoethylamine and 300 parts of anhydrous ethanol are heated in an autoclave for 15 hours at 120°. After cooling, the solvent is removed from the reaction mixture in vacuo, the residue is extracted with a mixture of chloroform/ether and the extract is filtered. The filtrate is washed with water and then extracted with dilute hydrochloric acid. While cooling, the hydrochloric acid extract is made alkaline with dilute caustic soda lye. The oil which separates is dissolved in chloroform, the chloroform solution is dried with sodium sulphate and concentrated whereupon the 3 - phenyl - 4 - [β - dimethylaminoethylamino]-coumarin remains as an oil. It crystallises from methanol/ether in colourless crystals which melt at 131°.

The hydrochloride is produced by dissolving the 3-phenyl - 4 - [β-dimethylaminoethylamino]-coumarin in anhydrous benzene and introducing anhydrous hydrochloric acid gas into the solution while cooling. The hydrochloride which precipitates is crystallised from methanol/ether whereupon yellow crystals are obtained which melt at 201° and which easily dissolve in water.

The following compounds are produced analogously:

3-phenyl-4-[γ-dimethylamino-propylamino]-coumarin, M.P. 138°, 3-phenyl-4-[β-dimethylamino-ethylamino]-6-chloro-coumarin, M.P. 193°, 3-benzyl-4-[β-dimethylamino-ethylamino]-7-chloro-coumarin, M.P. 109°, 3-butyl-4-[β-dimethylamino-ethylamino]-coumarin, B.P. 163°/0.01 Torr, 3-butyl-4-[γ-dimethylamino-propylamino]-coumarin, B.P. 167°/0.01 Torr.

*Example 4*

10 parts of 3-butyl-4-hydroxycoumarin and 55 parts of anhydrous 20% ethanolic dimethylamine are heated in an autoclave for 15 hours at 150°. After cooling, the solvent is evaporated off and the residue taken up in chloroform. The solution obtained is extracted with 2 N caustic soda lye, washed with water, dried with sodium sulphate and concentrated in vacuo. The residue is dissolved in a mixture of ether and chloroform 9:1 and chromatographed through a neutral aluminium oxide column. The third and fourth fractions are 3-butyl-4-dimethylamino-coumarin. Recrystallised from ether, the compound melts at 58–60°.

What is claimed is:
1. Compound of the formula

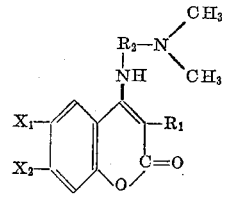

wherein
$R_1$ is a member selected from the group consisting of phenyl, benzyl and butyl,
$R_2$ is a member selected from the group consisting of —$CH_2$—$CH_2$— and —$CH_2$—$CH_2$—$CH_2$,
$X_1$ is a member selected from the group consisting of hydrogen and chlorine,
$X_2$ is a member selected from the group consisting of hydrogen and chlorine, and
when one of $X_1$ and $X_2$ is chlorine the other is hydrogen.

2. 3-phenyl-4-[β-dimethylamino-ethylamino]-6-chloro-coumarin.

3. 3-benzyl-4-[β - dimethylamino-ethylamino]-7-chloro-coumarin.

4. 3 - phenyl - 4 - [β - dimethylamino-ethylamino]-coumarin.

5. 3 - butyl - 4 - [β - dimethylamino-ethylamino]-coumarin.

References Cited in the file of this patent

UNITED STATES PATENTS 3,047,546     Lobert et al. _____ July 31, 1962

OTHER REFERENCES

Anschutz: Annalen de Chemie, vol. 3677 (1909), pages 218, 232 and 243.

Overman et al.: Jour. Biological Chem., vol. 153 (1944), page 20.

Chemical Abstracts, Subject Index, vol. 45 (1951), page 11603.

Mangini et al.: Gazz. Chim. Ital., vol. 87 (1957), page 274.

Karrer: Organic Chemistry, 2nd Eng. Ed., Elsevier Co., N.Y. (1946), page 24.